United States Patent [19]

Hara

[11] Patent Number: 5,764,791
[45] Date of Patent: Jun. 9, 1998

[54] METHOD FOR DETERMINING THE SHAPE AND LOCATION OF AN IRRADIATION FIELD

[75] Inventor: Shoji Hara, Kanagawa-Ken, Japan

[73] Assignee: Fuji Photo Film Co., Ltd., Kanagawa, Japan

[21] Appl. No.: 13,739

[22] Filed: Feb. 4, 1993

[30] Foreign Application Priority Data

Mar. 5, 1992 [JP] Japan .................................. 4-048293
Mar. 16, 1992 [JP] Japan .................................. 4-058087

[51] Int. Cl.$^6$ .................................................. G06K 9/00
[52] U.S. Cl. ............................................. 382/132; 250/586
[58] Field of Search .......................... 382/6, 9, 22, 25, 382/132, 281; 364/413.13, 413.14, 413.23; 250/327.2 F, 587, 586, 327.2 G; 378/99; 358/448, 453, 462, 111

[56] References Cited

U.S. PATENT DOCUMENTS

| | | |
|---|---|---|
| 4,258,264 | 3/1981 | Kotera et al. |
| 4,276,473 | 6/1981 | Kato et al. |
| 4,315,318 | 2/1982 | Kato et al. |
| 4,346,295 | 8/1982 | Tanaka et al. |
| 4,387,428 | 6/1983 | Ishida et al. |
| 4,527,060 | 7/1985 | Suzuki et al. |
| 4,682,028 | 7/1987 | Tanaka et al. |
| 4,967,079 | 10/1990 | Shimura |
| 4,970,393 | 11/1990 | Funahashi ........................ 250/327.2 |
| 4,977,504 | 12/1990 | Funahashi |
| 5,033,100 | 7/1991 | Hara et al. ........................ 382/6 |
| 5,068,907 | 11/1991 | Takeo ............................... 382/6 |
| 5,081,580 | 1/1992 | Takeo ............................ 364/413.13 |

FOREIGN PATENT DOCUMENTS 56-11395  2/1981  Japan.
61-5193   2/1986  Japan.

OTHER PUBLICATIONS

English Language abstract of Japanese Patent Publication No. *61–5193*.

English Language Translation of Japanese Unexamined Patent Publication No. *56–11395*.

*Primary Examiner*—Wellington Chin
*Assistant Examiner*—Jean B. Corrielus
*Attorney, Agent, or Firm*—Sughrue, Mion, Zinn, Macpeak & Seas, PLLC

[57] ABSTRACT

An image signal is obtained from a recording medium, on which a radiation image has been recorded with an irradiation field being limited. A prospective contour point of the irradiation field is detected from signal components corresponding to positions on the recording medium located along each of lines radiating from a predetermined point in the region inside of the irradiation field towards edges of the recording medium. Differentiation processing is carried out on the signal components corresponding to positions on the recording medium located along each radial line in order to obtain differentiated values. If both the differentiated values, which are respectively negative and positive and the absolute values of which are larger than a predetermined value, occur while the differentiation processing proceeds from a signal component corresponding to the predetermined point in the region inside of the irradiation field towards a signal component corresponding to each edge of the recording medium, the region extending between the points on the recording medium associated with the two differentiated values is removed from the region surrounded by lines connecting the prospective contour points, and the resulting region is detected as the irradiation field.

6 Claims, 8 Drawing Sheets

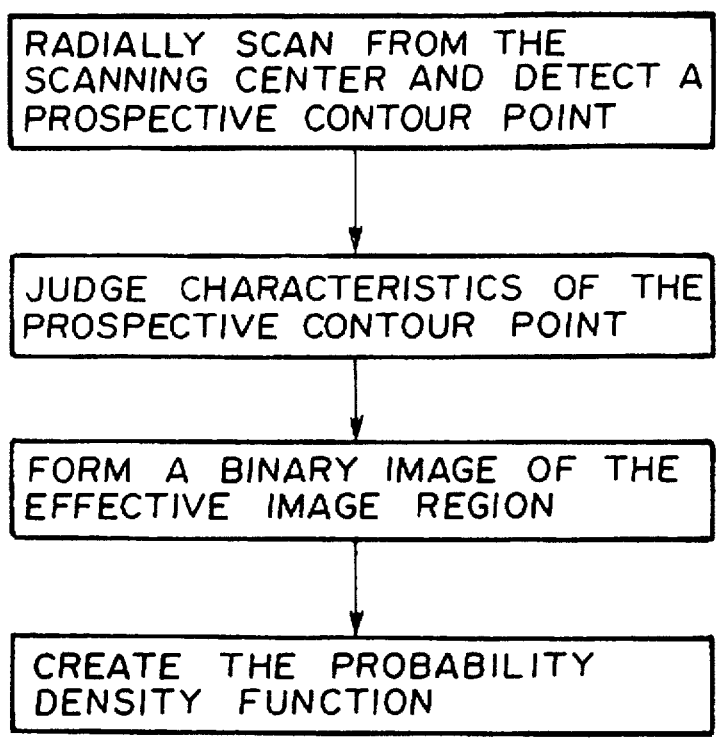
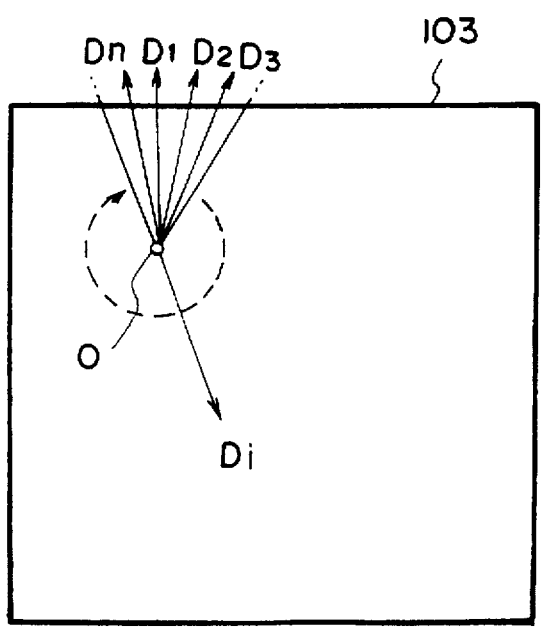

METHOD FOR DETERMINING THE SHAPE AND LOCATION OF AN IRRADIATION FIELD

BACKGROUND OF THE INVENTION

1. Field of the Invention

This invention relates to a method for determining the shape and location of an irradiation field on a recording medium when a radiation image is to be read out from the recording medium, on which the radiation image has been recorded.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal (an image signal), and the image signal is processed and then used for reproducing the X-ray image as a visible image on a photocopy, or the like. In this manner, a visible image having good image quality with high contrast, high sharpness, high graininess, or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

In order for an image signal to be detected accurately, certain factors which affect the image signal must be set in accordance with the dose of radiation delivered to the stimulable phosphor sheet and the like. Novel radiation image recording and reproducing systems which accurately detect an image signal have been proposed in, for example, U.S. Pat. No. 4,527,060. The proposed radiation image recording and reproducing systems are constituted such that a preliminary read-out operation (hereinafter simply referred to as the "preliminary readout") is carried out in order approximately to ascertain the radiation image stored on the stimulable phosphor sheet. In the preliminary readout, the stimulable phosphor sheet is scanned with a light beam having a comparatively low energy level, and a preliminary read-out image signal obtained during the preliminary read-out is analyzed. Thereafter, a final read-out operation (hereinafter simply referred to as the "final readout") is carried out to obtain the image signal, which is to be used during the reproduction of a visible image. In the final readout, the stimulable phosphor sheet is scanned with a light beam having an energy level higher than the energy level of the light beam used in the preliminary readout, and the radiation image is read out with the factors affecting the image signal adjusted to appropriate values on the basis of the results of an analysis of the preliminary read-out image signal.

The term "read-out conditions" as used hereinafter means a group of various factors, which are adjustable and which affect the relationship between the amount of light emitted by the stimulable phosphor sheet during image readout and the output of a read-out means. For example, the term "read-out conditions" may refer to a read-out gain and a scale factor which define the relationship between the input to the read-out means and the output therefrom, or to the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed.

Regardless of whether the preliminary readout is or is not carried out, it has also been proposed to analyze the image signal (or the preliminary read-out image signal) obtained and to adjust the image processing conditions, which are to be used when the image signal is processed, on the basis of the results of an analysis of the image signal. The term "image processing conditions" as used herein means a group of various factors, which are adjustable and set when an image signal is subjected to processing, which affects the gradation, sensitivity, or the like, of a visible image reproduced from the image signal. The proposed method is applicable to cases where an image signal is obtained from a radiation image recorded on a recording medium such as conventional X-ray film, as well as to systems using stimulable phosphor sheets.

Various methods have been proposed for calculating how the read-out conditions for the final readout and/or the image processing conditions should be adjusted on the basis of an analysis of the image signal (or the preliminary read-out image signal). As one of such methods, it has been proposed in, for example, U.S. Pat. No. 4,682,028 to create a probability density function of the image signal.

When a probability density function of an image signal is created, the characteristics of the corresponding radiation image recorded on a recording medium, such as a stimulable phosphor sheet or X-ray film, can be ascertained based on, for example, the maximum value of the image signal, the minimum value of the image signal, or an image signal value which occurs most frequently, i.e. the image signal value corresponding to the maximum value of the probability density function. Therefore, if the read-out conditions for the final readout, such as the read-out gain or the scale factor, and/or the image processing conditions are based on the results of an analysis of the probability density function of the image signal, it becomes possible to reproduce a visible image which has good image quality and can serve as an effective tool in, particularly, the efficient and accurate diagnosis of an illness.

Also, when a radiation image is recorded on a recording medium, it is often desirable that portions of the object not related to a diagnosis, or the like, are prevented from being exposed to radiation. Further, if the object portions not related to a diagnosis, or the like, are exposed to radiation, the radiation will be scattered by such portions to the portion that is related to a diagnosis, or the like, and the image quality will be adversely affected by the scattered radiation. Therefore, when a radiation image is recorded on the recording medium, an irradiation field stop is often used to limit the irradiation field to an area smaller than the overall recording region of the recording medium so that radiation may be irradiated only to that portion of the object, the image of which is to be used, and part of the recording medium.

However, in cases where the read-out conditions for the final readout and/or the image processing conditions are calculated on the basis of the results of an analysis of the image signal in the manner described above and the image signal is detected from a recording medium, on which the irradiation field was limited during the recording of the radiation image, the read-out conditions for the final readout and/or the image processing conditions cannot be determined accurately due to adverse effects of the scattered radiation if the probability density function is created from the image signal corresponding to the whole area of the image. As a result, a visible radiation image having good image quality and capable of serving as an effective tool in, particularly, the efficient and accurate diagnosis of an illness cannot be reproduced.

In order to eliminate the aforesaid problem, it is necessary to determine the shape and location of an irradiation field and then to calculate the read-out conditions for the final readout and/or the image processing conditions on the basis of only the image signal representing image information stored in the region inside of the irradiation field.

Accordingly, the applicant has proposed in, for example, U.S. Pat. No. 4,967,079 a novel method for accurately determining the shape and location of an irradiation field even when the irradiation field has an irregular shape. The proposed method comprises the steps of detecting a contour point, which is considered to be present on the contour of the irradiation field, on each of a plurality of radial lines each of which connects a predetermined point located in the region inside of the irradiation field with an edge of a recording medium, and determining that the region surrounded by lines connecting the thus detected contour points is the irradiation field. The proposed method may be referred to as a method for determining the shape and location of a circular irradiation field.

When a radiation image is recorded on a recording medium, it is often desirable for portions of the object not related to a diagnosis or the like to be prevented from being exposed to radiation. Therefore, in many cases, when a radiation image is recorded, a radiation blocking plate made of lead, or the like, is placed at part of the object. Also, it often occurs that a radiation image of a patient having an artificial bone incorporated therein is recorded on the recording medium. The radiation blocking plate and the artificial bone have high radiation absorptivities. Therefore, the image parts corresponding to the radiation blocking plate and the artificial bone have markedly low image densities in the reproduced radiation images. (A material having a high radiation absorptivity, such as a radiation blocking plate or an artificial bone, will hereinafter be referred to as the "radiation blocking material.")

Therefore, in cases where a radiation image of an object having been recorded on a recording medium has a pattern of the radiation blocking material embedded therein, it is difficult to separate a pattern of a low image density part of the object and the pattern of the radiation blocking material from each other in the probability density function of the image signal representing the radiation image. Accordingly, when the radiation image recorded on the recording medium is ascertained in the manner described above, it will occur that the pattern of the radiation blocking material is regarded by mistake as the pattern of the low image density part of the object. As a result, the problems occur in that the pattern of the radiation blocking material is found as having an image density higher than its actual image density, and the image density of the radiation image of the object is detected as being markedly higher than the appropriate level of the image density.

In order to eliminate the aforesaid problems, a method has heretofore been used wherein a range of image signal components on a low image density side, which components represent an image part corresponding to a radiation blocking material, are eliminated from the probability density function of a preliminary read-out image signal and the radiation image is ascertained from the remainder of the probability density function. However, the range, over which the image signal components representing the image part corresponding to the radiation blocking material are distributed, varies in accordance with, for example, what portion of an object is recorded and what image recording method is used. Therefore, with the conventional method, it is not always possible to ascertain accurately the range over which the image signal components representing the image part corresponding to a radiation blocking material are distributed (stated reversely, the range over which the image signal components representing a desired image part, which it is necessary to view and which is outside of the image part corresponding to the radiation blocking material, are distributed).

The problems described above can be solved by accurately determining a desired image region on a recording medium having a radiation image recorded thereon, the desired image region carrying only a desired image which it is necessary to view and which is outside of the image part corresponding to a radiation blocking material, and thereafter setting the read-out conditions for the final readout and/or the image processing conditions in accordance with only the image information recorded in the desired image region.

Accordingly, the applicant has proposed, in U.S. Pat. No. 4,977,504, a method for determining a desired image signal range substantially representing only a desired part of a radiation image, which part is outside of an image part corresponding to a radiation blocking material such as an artificial bone, from an image signal, which has been detected during an image read-out operation from a recording medium having the radiation image recorded thereon together with an image pattern of the radiation blocking material. The proposed method for determining a desired image signal range comprises the steps of:

i) carrying out differentiation processing on image signal components of the image signal corresponding to positions located along each of a plurality of lines on the recording medium, which lines include lines extending across the image part corresponding to the radiation blocking material, ii) finding the absolute values among the values resulting from the carrying out of the differentiation processing on the image signal components, which absolute values exceed a predetermined threshold value, and extracting the image signal components which correspond to the points on the recording medium associated with the absolute values exceeding the threshold value, iii) generating a probability density function of the extracted image signal components, and finding a specific signal value which is determined by a signal value corresponding to the maximum value of the probability density function, and iv) determining the signal range on the higher image density side than the specific signal value as the desired image signal range.

The applicant also proposed, in U.S. Pat. No. 4,977,504, a method for determining a desired image region on a recording medium having a radiation image of an object recorded thereon together with an image pattern of a radiation blocking material, which image region substantially carries only a desired image part outside of the image part corresponding to the radiation blocking material. The proposed method for determining a desired image region comprises the steps of:

i) carrying out an image read-out operation on the recording medium in order to obtain an image signal, ii) carrying out differentiation processing on image signal components of the image signal corresponding to positions located along each of a plurality of lines on the recording medium, which lines include lines extending across the image part corresponding to the radiation blocking material, iii) finding the absolute values among the values resulting from the carrying out of the differentiation processing on the image signal components, which absolute values exceed a predetermined threshold value, iv) dividing the area of the recording medium into a plurality of small blocks, and finding the degree of occurrence, with which the points on the recording medium associated with the absolute values exceeding the threshold value occur in each of the small blocks, and v) determining a group of the small blocks, in which the degrees of occurrence of the points are not higher than a predetermined degree, as the desired image region.

In cases where the irradiation field is limited and a radiation image of an object is recorded together with an image pattern of a radiation blocking material, it is necessary for the shape and location of the irradiation field to be determined from the image signal representing the radiation image. However, with the method for determining the shape and location of an irradiation field, which is disclosed in U.S. Pat. No. 4,967,079, the problems occur in that the region containing the image pattern of the radiation blocking material is detected as the irradiation field, and therefore the probability density function created from only the image signal corresponding to the region inside of the irradiation field includes unnecessary low density image signal components.

With the method for determining a desired image signal range, which is disclosed in U.S. Pat. No. 4,977,504, and with the method for determining a desired image region, which is also disclosed in U.S. Pat. No. 4,977,504, the desired image range is determined from the image signal corresponding to the whole area of the recording medium. Therefore, it is difficult to determine the desired image range accurately from a recording medium, which includes a wide region that is outside of an irradiation field and that was not exposed to radiation during the image recording operation.

SUMMARY OF THE INVENTION

The primary object of the present invention is to provide a method for determining the shape and location of an irradiation field, wherein the shape and location of a desired irradiation field are determined from an image signal having been obtained from a recording medium, on which the irradiation field has been limited and a radiation image of an object has thereby been recorded together with an image pattern of a radiation blocking material.

Another object of the present invention is to provide a method for determining the shape and location of an irradiation field, wherein the shape and location of a desired irradiation field are determined from an image signal having been obtained from a recording medium, on which the irradiation field has been limited and a radiation image of an object has thereby been recorded together with an image pattern of a radiation blocking material, or from a recording medium, on which a radiation image of an object has been recorded by using a concave irradiation field stop.

The present invention provides a first method for determining the shape and location of an irradiation field, wherein an image signal, which is made up of a series of image signal components representing a radiation image of an object, is obtained from a recording medium, on which the radiation image has been recorded with an irradiation field being limited, a prospective contour point, which is considered as being present on a contour of the irradiation field on the recording medium, is detected from image signal components corresponding to positions on the recording medium located along each of lines in a plurality of radial directions, which lines radiate from a predetermined point located in the region inside of the irradiation field on the recording medium towards edges of the recording medium, and a region surrounded by lines connecting the thus detected prospective contour points is detected as the irradiation field, the method for determining the shape and location of an irradiation field comprising the steps of:

i) carrying out differentiation processing on the image signal components corresponding to positions on the recording medium located along each of the lines in the plurality of the radial directions, differentiated values being thereby obtained from the differentiation processing, and ii) in cases where a differentiated value, which is negative and the absolute value of which is larger than a predetermined value, and a differentiated value, which is positive and the absolute value of which is larger than a predetermined value, occur while the differentiation processing is proceeding from an image signal component corresponding to the predetermined point, which is located in the region inside of the irradiation field on the recording medium, towards an image signal component corresponding to each of the edges of the recording medium, removing the region, which extends between the points on the recording medium associated with the two differentiated values, from the region surrounded by the lines connecting the prospective contour points, whereby it is determined that a region resulting from the removal is the irradiation field.

With the first method for determining the shape and location of an irradiation field in accordance with the present invention, the image signal, which is made up of a series of image signal components representing the radiation image of the object, is obtained from the recording medium, on which the radiation image has been recorded with the irradiation field being limited. A prospective contour point, which is considered as being present on a contour of the irradiation field on the recording medium, is detected from the image signal components corresponding to positions on the recording medium located along each of the lines in the plurality of the radial directions, which lines radiate from the predetermined point located in the region inside of the irradiation field on the recording medium towards the edges of the recording medium. The region surrounded by the lines connecting the thus detected prospective contour points is found as the Irradiation field. Also, differentiation processing is carried out on the image signal components corresponding to positions on the recording medium located along each of the lines in the plurality of the radial directions, and differentiated values are thereby obtained from the differentiation processing. In cases where a differentiated value, which is negative and the absolute value of which is larger than a predetermined value, and a differentiated value, which is positive and the absolute value of which is larger than a predetermined value, occur while the differentiation processing is proceeding from an image signal component corresponding to the predetermined point, which is located in the region inside of the irradiation field on the recording medium, towards an image signal component corresponding to each of the edges of the recording medium, the region, which extends between the points on the recording medium associated with these two differentiated values, (i.e., the region corresponding to the image signal components representing an image pattern of a radiation blocking material and having small signal values) is removed from the irradiation field. Therefore, the shape and location of the desired irradiation field can be determined from the image signal having been obtained from the recording medium, on which the irradiation field has been limited and the radiation image of the object has thereby been recorded together with the image pattern of the radiation blocking material. Accordingly, the read-out conditions for the final readout and/or the image processing conditions, under which the image processing is to be carried out, can be adjusted accurately.

The present invention also provides a second method for determining the shape and location of an irradiation field, wherein an image signal, which is made up of a series of image signal components representing a radiation image of an object, is obtained from a recording medium, on which the radiation image has been recorded with an irradiation field being limited, a prospective contour point, which is considered as being present on a contour of the irradiation field on the recording medium, is detected from image signal components corresponding to positions on the recording medium located along each of lines in a plurality of radial directions, which lines radiate from a predetermined point located in the region inside of the irradiation field on the recording medium towards edges of the recording medium, and a region surrounded by lines connecting the thus detected prospective contour points is detected as the irradiation field, the method for determining the shape and location of an irradiation field comprising the steps of:

i) carrying out differentiation processing on the image signal components corresponding to positions on the recording medium located along each of the lines in the plurality of the radial directions, differentiated values being thereby obtained from the differentiation processing, ii) with respect to all of the lines in the plurality of the radial directions, making judgments as to whether or not a differentiated value increases beyond a predetermined value while the differentiation processing is proceeding from an image signal component corresponding to the predetermined point, which is located in the region inside of the irradiation field on the recording medium, towards an image signal component corresponding to each of the edges of the recording medium, iii) in cases where it has been judged that differentiated values increasing beyond the predetermined value occur with respect to all of the lines in the plurality of the radial directions, with respect to each of the lines in the plurality of the radial directions, determining that the region, which extends from the point on the recording medium associated with each of the differentiated values increasing beyond the predetermined value to the corresponding prospective contour point, is an effective image region, iv) in cases where it has been judged that differentiated values increasing beyond the predetermined value occur continuously with respect to at least a predetermined number of lines among the lines in the plurality of the radial directions, a) making judgments as to flatness of the image signal components corresponding to positions on the recording medium located along each of the lines in the radial directions, for which the differentiated values increasing beyond the predetermined value do not occur, b) when it has been judged that the image signal components corresponding to positions on the recording medium located along each of the lines in the radial directions, for which the differentiated values increasing beyond the predetermined value do not occur, are flat, with respect to each of the lines in the radial directions, for which the differentiated values increasing beyond the predetermined value occur, determining that the region, which extends from the point on the recording medium associated with each of the differentiated values increasing beyond the predetermined value to the corresponding prospective contour point, is an effective image region, and v) determining that the effective image region and the vicinity of the effective image region are the irradiation field.

With the second method for determining the shape and location of an irradiation field in accordance with the present invention, in cases where it has been judged that differentiated values increasing beyond the predetermined value occur with respect to all of the lines in the plurality of the radial directions, it is determined, with respect to each of the lines in the plurality of the radial directions, that the region, which extends from the point on the recording medium associated with each of the differentiated values increasing beyond the predetermined value to the corresponding prospective contour point, is an effective image region. This means that the region, which is surrounded by the points on the recording medium associated with the differentiated values increasing beyond the predetermined value, is removed from the region surrounded by the prospective contour points, and the region resulting from the removal is detected as the effective image region.

The predetermined number of lines among the lines in the plurality of the radial directions is selected, depending on the number of the lines in the radial directions. In general, a number of the lines ranging over at least a semicircle or an area of at least 180 degrees in terms of the angle of the radial direction is set as the predetermined number of lines among the lines in the plurality of the radial directions.

Also, the term "flatness of image signal components" as used herein means that the values of the image signal components are approximately uniform.

With the second method for determining the shape and location of an irradiation field in accordance with the present invention, the image signal, which is made up of a series of image signal components representing the radiation image of the object, is obtained from the recording medium, on which the radiation image has been recorded with the irradiation field being limited. A prospective contour point, which is considered as being present on the contour of the irradiation field on the recording medium, is detected from the image signal components corresponding to positions on the recording medium located along each of the lines in the plurality of the radial directions, which lines radiate from the predetermined point located in the region inside of the irradiation field on the recording medium towards the edges of the recording medium. A region surrounded by lines connecting the thus detected prospective contour points is detected as the irradiation field. Also, differentiation processing is carried out on the image signal components corresponding to positions on the recording medium located along each of the lines in the plurality of the radial directions, and the differentiated values are thereby obtained from the differentiation processing. With respect to all of the lines in the plurality of the radial directions, judgments are made as to whether or not a differentiated value increases beyond a predetermined value while the differentiation processing is proceeding from an image signal component corresponding to the predetermined point, which is located in the region inside of the irradiation field on the recording medium, towards an image signal component corresponding to each of the edges of the recording medium. In cases where it has been judged that differentiated values increasing beyond the predetermined value occur with respect to all of the lines in the plurality of the radial directions, it is determined, with respect to each of the lines in the plurality of the radial directions, that the region, which extends from the point on the recording medium associated with each of the differentiated values increasing beyond the predetermined value to the corresponding prospective contour point, is an effective image region. It is then determined that the effective image region and the vicinity of the effective image region are the irradiation field. In cases where it has been judged that differentiated values increasing beyond the predetermined value occur continuously with respect to at least a predetermined number of lines among the lines in the plurality of the radial directions, judgments are made as to flatness of the image signal components corresponding to positions on the recording medium located along the lines in the radial directions, for which the differentiated values increasing beyond the predetermined value do not occur. When it has been judged that the image signal components corresponding to positions on the recording medium located along the lines in the radial directions, for which the differentiated values increasing beyond the predetermined value do not occur, are flat, it is determined, with respect to each of the lines in the radial directions, for which the differentiated values increasing beyond the predetermined value occur, that the region, which extends from the point on the recording medium associated with each of the differentiated values increasing beyond the predetermined value to the corresponding prospective contour point, is an effective image region. It is then determined that the effective image region and the vicinity of the effective image region are the irradiation field. Therefore, the shape and location of the desired irradiation field can be determined from the image signal having been obtained from the recording medium, on which the irradiation field has been limited and the radiation image of the object has thereby been recorded together with the image pattern of a radiation blocking material, or from the recording medium, on which the radiation image of the object has been recorded by using a concave irradiation field stop. Accordingly, the read-out conditions for the final readout and/or the image processing conditions, under which the image processing is to be carried out, can be adjusted accurately.

BRIEF DESCRIPTION OF THE DRAWINGS

FIG. 4 is a block diagram showing how the processing in an irradiation field determining circuit is carried out in the embodiment of the first method for determining the shape and location of an irradiation field in accordance with the present invention, FIG. 5 is an explanatory view showing an example of how the image signal components of an image signal can be extracted in the embodiment of the first method for determining the shape and location of an irradiation field in accordance with the present invention.

DESCRIPTION OF THE PREFERRED EMBODIMENTS

The present invention will hereinbelow be described in further detail with reference to the accompanying drawings.

Figure 1:
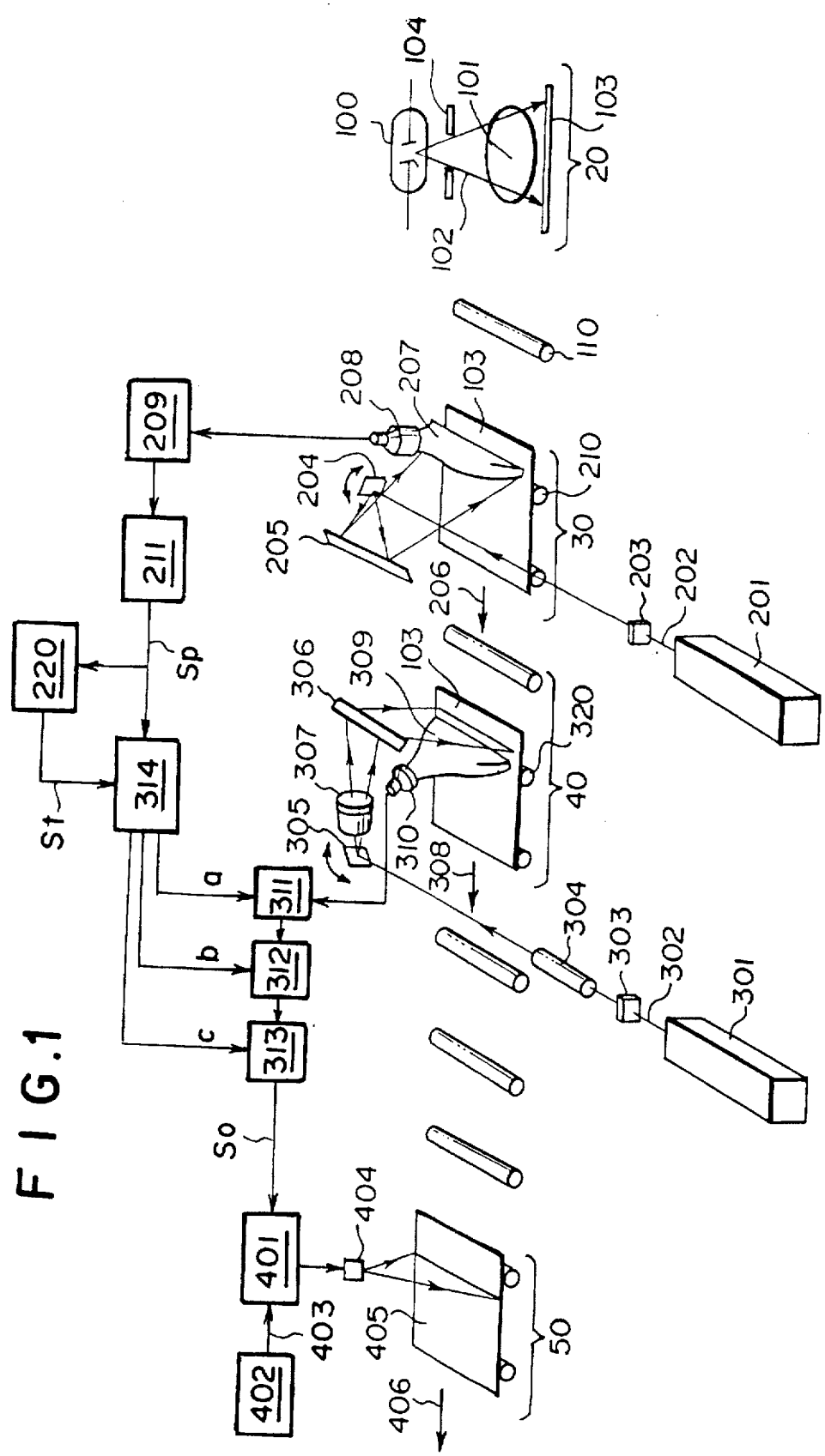
FIG. 1 is a schematic view showing a radiation image recording and reproducing system wherein an embodiment of the first method for determining the shape and location of an irradiation field in accordance with the present invention is employed.

FIG. 1 is a schematic view showing a radiation image recording and reproducing system wherein an embodiment of the first method for determining the shape and location of an irradiation field in accordance with the present invention is employed. With reference to FIG. 1, the radiation image recording and reproducing system comprises basically a radiation image recording section 20, a preliminary read-out section 30, a final read-out section 40, and an image reproducing section 50. In the radiation image recording section 20, a radiation 102 is produced by a radiation source 100, which may be constituted of an X-ray tube, or the like. The radiation 102 is irradiated towards an object 101. A stimulable phosphor sheet 103 capable of storing energy from radiation thereon is placed at a position where the stimulable phosphor sheet 103 is exposed to the radiation 102, which has passed through the object 101. A radiation image of the object 101 is thereby stored on the stimulable phosphor sheet 103. An irradiation field stop 104 for limiting the irradiation field of the radiation 102 on the stimulable phosphor sheet 103 is located between the radiation source 100 and the object 101.

The stimulable phosphor sheet 103, on which the radiation image of the object 101 has been stored, is sent to the preliminary read-out section 30 by a sheet conveyance means 110, which may be constituted of a conveyor roller, or the like. In the preliminary read-out section 30, a laser beam 202 is produced by a laser beam source 201. The laser beam 202 first passes through a filter 203, which filters out light having wavelengths within the range of wavelengths of the light emitted by the stimulable phosphor sheet 103 when it is stimulated by the laser beam 202. Then, the laser beam 202 is one-dimensionally deflected by a light deflector 204, such as a galvanometer mirror, and directed onto the stimulable phosphor sheet 103 by a plane reflection mirror 205. The laser beam source 201 is selected so that the laser beam 202 produced thereby has a wavelength distribution different from and far apart from the wavelength distribution of the light emitted by the stimulable phosphor sheet 103 when it is stimulated. While the laser beam 202 impinges upon the stimulable phosphor sheet 103, the stimulable phosphor sheet 103 is moved in the direction indicated by the arrow 206 (i.e. in the sub-scanning direction) by a sheet conveyance means 210. The sheet conveyance means 210 may be constituted of conveyor rollers, or the like. In this manner, the overall surface of the stimulable phosphor sheet 103 is exposed to and scanned with the laser beam 202. The power of the laser beam source 201, the beam diameter of the laser beam 202, the speed with which the laser beam 202 scans, and the speed at which the stimulable phosphor sheet 103 moves are selected so that the level of the stimulation energy of the laser beam 202 used during the preliminary readout is lower than the level of the stimulation energy of the laser beam used during the final readout carried out in the final readout section 40.

When it is exposed to the laser beam 202 in the manner described above, the stimulable phosphor sheet 103 emits light in an amount proportional to the amount of energy stored thereon during its exposure to the radiation. The emitted light enters a light guide member 207, which may be of the shape and material disclosed in U.S. Pat. No. 4,346, 295. The emitted light is guided inside of the light guide member 207 through total reflection, emanates from a light output face of the light guide member 207, and is received by a photodetector 208, which may be constituted of a photomultiplier, or the like. The light receiving face of the photodetector 208 is positioned so that it is in close contact with a filter, which transmits only light having wavelengths within the range of wavelengths of light emitted by the stimulable phosphor sheet 103 and filters out light having wavelengths within the range of wavelengths of the stimulating rays. Therefore, the photodetector 208 detects only the light emitted by the stimulable phosphor sheet 103 when it is stimulated by the laser beam 202. The light detected by the photodetector 208 is converted into an electric signal carrying the image information stored on the stimulable phosphor sheet 103, and is then amplified by an amplifier 209. The signal, which has been generated by the amplifier 209, is digitized by an A/D converter 211 and sent as a preliminary read-out image signal Sp to a final read-out control circuit 314, which is located in the final read-out section 40. On the basis of the image information, which the preliminary read-out image signal Sp represents, the final read-out control circuit 314 calculates a read-out gain setting value (a), a scale factor setting value (b), and a reproduced image processing condition setting value (c). The preliminary read-out image signal Sp is also sent to an irradiation field determining circuit 220, which will be described in detail later.

After the preliminary readout from the stimulable phosphor sheet 103 is finished, the stimulable phosphor sheet 103 is sent to the final read-out section 40. In this section, a laser beam 302 is produced by a laser beam source 301. The laser beam 302 first passes through a filter 303, which filters out light having wavelengths within the range of the wavelengths of light emitted by the stimulable phosphor sheet 103 when it is stimulated by the laser beam 302. Thereafter, the beam diameter of the laser beam 302 is precisely adjusted by a beam expander 304. The laser beam 302 is then deflected by a light deflector 305, which may be constituted of a galvanometer mirror, or the like. The laser beam 302 is thus caused to impinge upon the stimulable phosphor sheet 103 by a plane reflection mirror 306. Between the light deflector 305 and the plane reflection mirror 306, an fθ lens 307 is disposed in order to keep the beam diameter of the laser beam 302 uniform as it scans the stimulable phosphor sheet 103. While the laser beam 302 impinges upon the stimulable phosphor sheet 103, the stimulable phosphor sheet 103 is moved in the direction indicated by the arrow 308 (i.e. in the sub-scanning direction) by a sheet conveyance means 320, which may be constituted of conveyor rollers, or the like. Consequently, the overall area of the stimulable phosphor sheet 103 is exposed to and scanned with the laser beam 302. When the stimulable phosphor sheet 103 is exposed to the laser beam 302, it emits light in proportion to the amount of energy stored thereon during its exposure to the radiation. The light emitted enters a light guide member 309, which is made of the same material and has the same configuration as the light guide member 207 used during the preliminary readout. The light emitted by the stimulable phosphor sheet 103 is guided inside of the light guide member 309 through repeated total reflection, emanates from the light output face of the light guide member 309, and is received by a photodetector 310, which may be constituted of a photomultiplier, or the like. The light receiving face of the photodetector 310 is positioned such that it is in close contact with a filter, which selectively transmits only the light having wavelengths within the range of wavelengths of light emitted by the stimulable phosphor sheet 103. Therefore, the photodetector 310 detects only the light emitted by the stimulable phosphor sheet 103.

The output of the photodetector 310, which has photoelectrically detected the light emission representing the radiation image stored on the stimulable phosphor sheet 103, is amplified to an appropriate level by an amplifier 311. The gain of the amplifier 311 is adjusted on the basis of the read-out gain setting value (a) calculated by the control circuit 314. The amplified electric signal is fed into an A/D converter 312, which converts the electric signal into a digital signal by use of a scale factor which is adjusted by the scale factor setting value (b) so as to suit the width in the fluctuation of the values of the signal. The digital signal thus obtained is fed into a signal processing circuit 313, in which it is subjected to signal processing (image processing), the nature of which signal processing is based on the reproduced image processing condition setting value (c). After the digital signal is processed, a visible radiation image is obtained, which has good image quality and can serve as an effective tool in, particularly, the efficient and accurate diagnosis of an illness.

The processed digital signal is fed out as a read-out image signal (a final read-out image signal) So. The final read-out image signal So generated by the signal processing circuit 313 is fed into a light modulator 401 located in the image reproducing section 50. In the image reproducing section 50, a laser beam 403 is produced by a reproducing laser beam source 402. The laser beam 403 is modulated by the light modulator 401 on the basis of the final read-out image signal So having been received from the signal processing circuit 313. The laser beam 403 is caused to impinge upon a photosensitive material 405, such as photographic film, by a scanning mirror 404, which causes the laser beam 403 to scan the photosensitive material 405. At this time, the photosensitive material 405 is moved in a direction, which is normal to the aforesaid scanning direction, i.e. in the direction indicated by the arrow 406. Accordingly, the radiation image represented by the final read-out image signal So is recorded on the photosensitive material 405. In order for the radiation image to be reproduced, it is possible to use any other appropriate method, such as the aforesaid method using a CRT display device.

Figure 2:
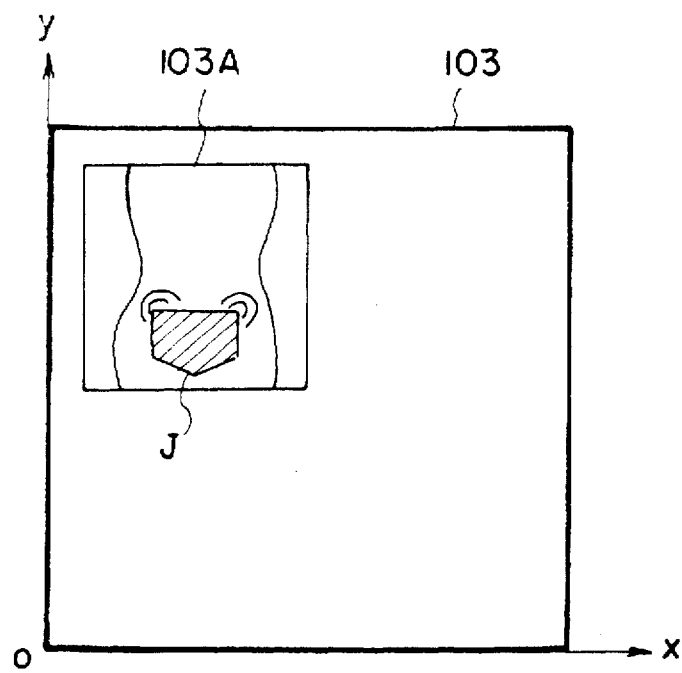
FIG. 2 is an explanatory view showing an example of a radiation image stored on a stimulable phosphor sheet in the embodiment of the first method for determining the shape and location of an irradiation field in accordance with the present invention.
Figure 3:
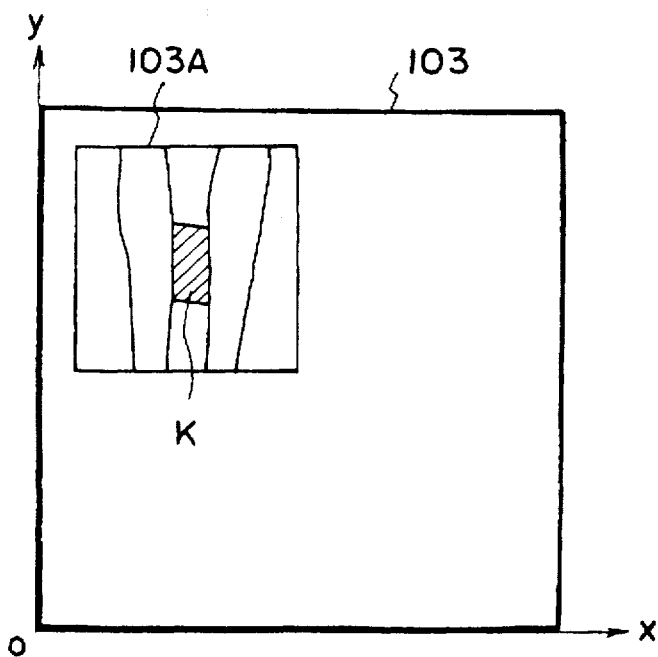
FIG. 3 is an explanatory view showing a different example of a radiation image stored on a stimulable phosphor sheet in the embodiment of the first method for determining the shape and location of an irradiation field in accordance with the present invention.

As illustrated in FIG. 2, when the radiation image of the object 101 is recorded, the irradiation field is often limited on the stimulable phosphor sheet 103, and part of the object 101 is often covered with a radiation blocking plate. In FIG. 2, reference character J represents the image part corresponding to the radiation blocking plate. Also, as illustrated in FIG. 3, it often occurs that the irradiation field is limited on the stimulable phosphor sheet 103, and a radiation image of an object having an artificial bone is recorded on the stimulable phosphor sheet 103. In FIG. 3, reference character K represents the image part corresponding to the artificial bone. The image part J corresponding to the radiation blocking plate and the image part K corresponding to the artificial bone have image densities markedly lower than the density of the object image part related to a diagnosis.

How the control circuit 314 accurately adjusts the read-out gain setting value (a), the scale factor setting value (b), and the image processing condition setting value (c) when the radiation image includes the image part J corresponding to the radiation blocking plate or the image part K corresponding to the artificial bone will be described hereinbelow with reference to FIG. 4.

As shown in FIG. 4, in the irradiation field determining circuit 220, signal scanning is carried out on the image signal components of the preliminary read-out image signal Sp starting with the component corresponding to a scanning center and continuing with components corresponding to positions on the stimulable phosphor sheet 103 located along each of lines in radial directions. In this manner, a prospective contour point is detected. Thereafter, a judgment is made as to the characteristics of the prospective contour point, i.e., as to whether the prospective contour point is the one present on the contour of the irradiation field or is the one present on the contour of the image part corresponding to the radiation blocking material. After the judgment has been made, the effective image region is converted into a binary image, and a probability density function is created from the binary image. On the basis of the probability density function, the read-out gain setting value (a), the scale factor setting value (b), and the image processing condition setting value (c) are adjusted. These processes will hereinbelow be described in detail.

First, the irradiation field determining circuit 220 extracts the image signal components of the digital preliminary read-out image signal Sp, which correspond to positions on the stimulable phosphor sheet 103 located along a line in a direction D1 shown in FIG. 5. Also, the irradiation field determining circuit 220 extracts the image signal components corresponding to positions on the stimulable phosphor sheet 103 located along each of lines in directions D2, D3, . . . . . Dn. The plurality of lines along the directions D1, D2, D3, . . . . . Dn radiate from a point O, which is located in the region inside of the radiation image on the stimulable phosphor sheet 103, towards the edges of the stimulable phosphor sheet 103. In this embodiment, lines along the radial directions D1, D2, D3, . . . . . Dn radiate at equal angle intervals.

Figure 6A:
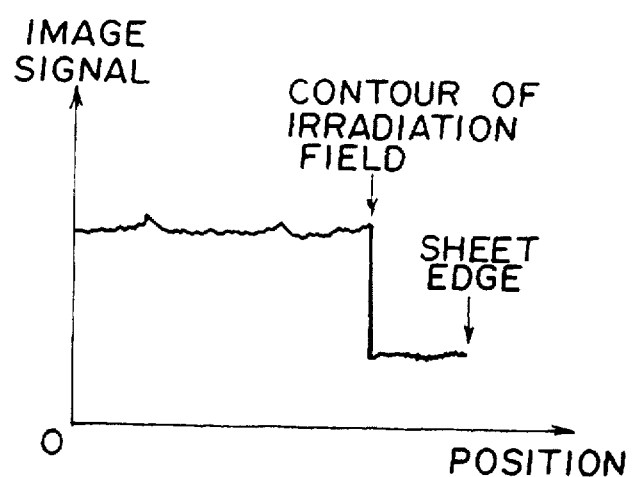
FIG. 6A is a graph showing an example of the distribution of image signal components of an image signal in the embodiment of the first method for determining the shape and location of an irradiation field in accordance with the present invention.

The levels of the image signal components of the preliminary read-out image signal Sp for the region inside of an irradiation field 103A are distinctly higher than those for the region outside of the irradiation field 103A. Therefore, the values of the image signal components of the preliminary read-out image signal Sp corresponding to positions on the stimulable phosphor sheet 103 located along, for example, a line in the radial direction D1 shown in FIG. 5 are distributed as shown in FIG. 6A. Also, the levels of the image signal components of the preliminary read-out image signal Sp for the region inside of the image part corresponding to the radiation blocking material are distinctly lower than those for the region outside of the image part corresponding to the radiation blocking material. Therefore, the values of the image signal components of the preliminary read-out image signal Sp corresponding to positions on the stimulable phosphor sheet 103 located along a line in a radial direction D1 shown in FIG. 5 are distributed as shown in FIG. 6B.

Figure 7A:
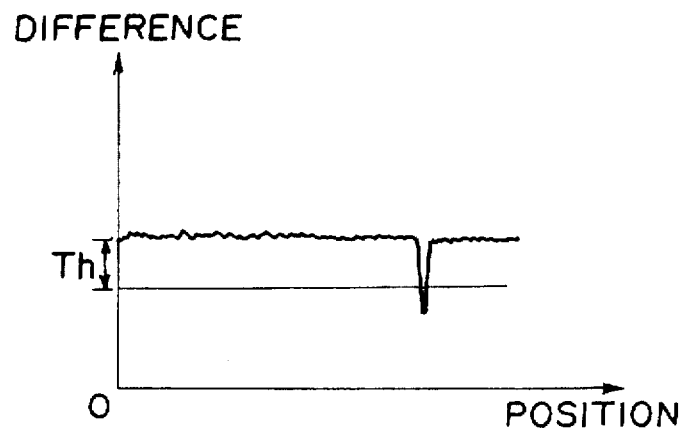
FIG. 7A is a graph showing an example of the distribution of the values of the differences between neighboring image signal components in the embodiment of the first method for determining the shape and location of an irradiation field in accordance with the present invention.

Thereafter, differentiation processing is carried out on the image signal components of the preliminary read-out image signal Sp, which have been extracted in the manner described above and which correspond to positions on the stimulable phosphor sheet 103 located along each of lines in the plurality of the radial directions D1, D2, D3, . . . . . Dn. From the differentiation processing, the values of differences (i.e., differentiated values) between neighboring image signal components are obtained. A prospective contour point, which is considered as being present on the contour of the irradiation field 103A on the stimulable phosphor sheet 103, is then detected from the values of the differences between the neighboring image signal components. Specifically, as shown in FIG. 7A, the absolute values of the differences between the neighboring image signal components, which are distributed as shown in FIG. 6A, change markedly at the contour of the irradiation field. Therefore, for example, of the points at which the absolute values of the differences exceed a predetermined threshold value, a point which is farthest from the point O located in the region inside of the radiation image is detected as a prospective contour point.

Figure 6B:
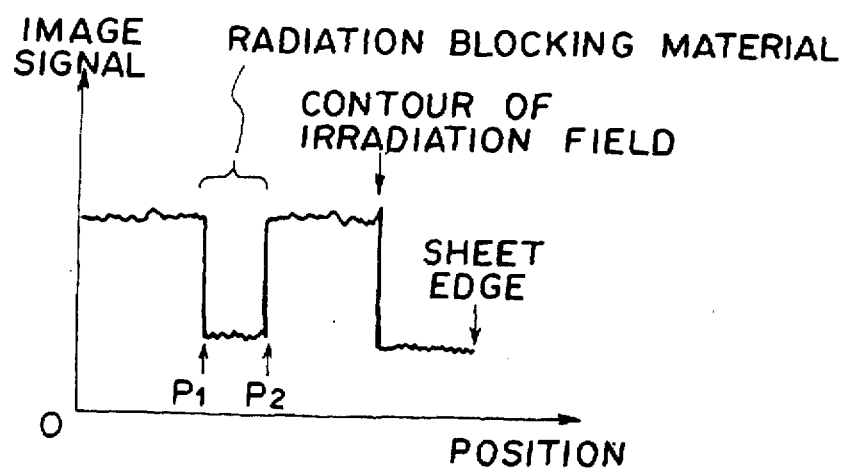
FIG. 6B is a graph showing a different example of the distribution of image signal components of an image signal in the embodiment of the first method for determining the shape and location of an irradiation field in accordance with the present invention.
Figure 7B:
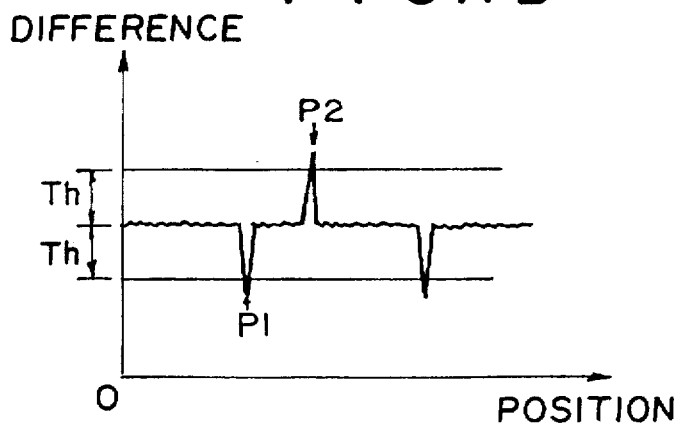
FIG. 7B is a graph showing a different example of the distribution of the values of the differences between neighboring image signal components in the embodiment of the first method for determining the shape and location of an irradiation field in accordance with the present invention.

On the other hand, in cases where the image signal components of the preliminary read-but image signal Sp are distributed as shown in FIG. 6B, the absolute values of the differences between the neighboring image signal components are distributed as shown in FIG. 7B. As illustrated in FIG. 7B, the absolute values of the differences between the neighboring image signal components change markedly at the contour of the irradiation field and at points P1 and P2. At the point P1, the value of the difference is negative and has the absolute value exceeding a predetermined threshold value Th. At the point P2, the value of the difference is positive and has the absolute value exceeding the predetermined threshold value Th. In cases where the values of the differences between the neighboring components, which are among the extracted image signal components of the preliminary read-out image signal Sp corresponding to a line in a radial direction, change in this manner, a binary image is formed by allocating a value of "0" to the image signal components for the region extending between a position on the stimulable phosphor sheet 103 associated with the point P1, at which the value of the difference becomes negative and has the absolute value exceeding the predetermined threshold value Th, and a position on the stimulable phosphor sheet 103 associated with the point P2, at which the value of the difference becomes positive and has the absolute value exceeding the predetermined threshold value Th. Also, a value of "1" is allocated to the image signal components for the region, which is other than the region allocated with the value of "0" and which is present on the side inward from the contour of the irradiation field.

For the purposes of forming the binary image, the lines along the radial directions D1, D2, D3, . . . . . Dn may be radiated at sufficiently small angle intervals. The value of "0" may be allocated to the image signal components representing the picture elements located along the part of each signal scanning line extending between the position on the stimulable phosphor sheet 103 associated with the point P1, at which the value of the difference becomes negative and has the absolute value exceeding the predetermined threshold value Th, and the position on the stimulable phosphor sheet 103 associated with the point P2, at which the value of the difference becomes positive and has the absolute value exceeding the predetermined threshold value Th. Also, the value of "1" may be allocated to the image signal components representing the picture elements located along the part of the signal scanning line, which part is other than the part of the signal scanning line allocated with the value of "0" and which is present on the side inward from the prospective contour point. Alternatively, approximately 120 lines along the radial directions D1, D2, D3, . . . , Dn may be radiated from the point O, and a binary image may be formed such that the image signal components corresponding to the picture elements falling within a neighboring region, which has its center at a picture element lying on each signal scanning line, (for example, a neighboring region including 3×3 picture elements surrounding the picture element lying on each signal scanning line) may be allocated with the same value as the value allocated to the image signal component representing the picture element taken as the center point of the neighboring region. Specifically, in cases where a certain picture element lying on each signal scanning line is present on the side inward from the prospective contour point, the value of "1" may be allocated to the image signal component corresponding to said certain picture element and to the image signal components corresponding to eight picture elements surrounding said certain picture element.

Also, before the binary image is formed, the positions of prospective contour points may be corrected in accordance with the information representing the prospective contour points detected for lines along a plurality of adjacent directions such that the shape of the irradiation field may become smooth.

Thereafter, only the image signal components corresponding to the region allocated with the value of "1", i.e., only the image signal components representing the image information stored in the region inside of the irradiation field 103A, are extracted from the preliminary read-out image signal Sp. The control circuit 314 creates the probability density function from the extracted image signal components. The probability density function thus created is the one only for the region obtained by removing the region inside of the image part corresponding to the radiation blocking material from the region on the stimulable phosphor sheet 103 which was actually exposed to the radiation. The control circuit 314 carries out an analysis of the probability density function which has thus been created. Therefore, the aforesaid setting values (a), (b), and (c) are made suitable for the actual image information stored on the stimulable phosphor sheet 103.

In the aforesaid embodiment, the extraction of the image signal components along the line in the direction heading towards the edge of the stimulable phosphor sheet is started on the image signal component representing the image information stored at the point O in the radiation image falling within the region inside of the irradiation field. However, the signal extraction may be started on an image signal component representing the image information stored at any position as long as the starting point lies in the region inside of the irradiation field. For example, in cases where the irradiation field is limited to a very small area, the center point of the stimulable phosphor sheet may be present in the region outside of the irradiation field. In such cases, the signal extraction should preferably be started on an image signal component representing the image information present at a position of the stimulable phosphor sheet which lies in the region inside of the irradiation field, for example, a position at which the image density level is the highest among the image density levels on the stimulable phosphor sheet, a position at which the center of gravity of the image density is located, or at position at which the center of gravity in the region on a high density side is located when the image density levels are converted into the binary system.

Figure 8:
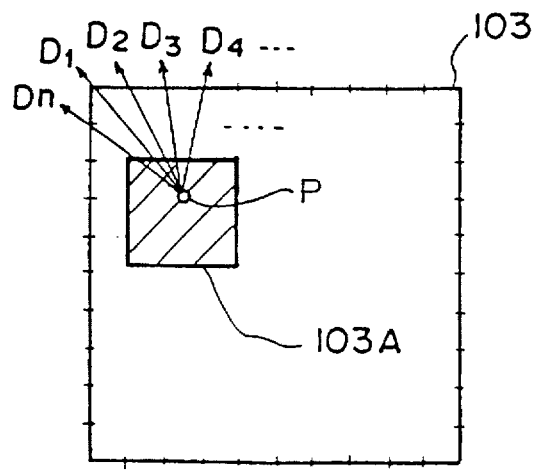
FIG. 8 is an explanatory view showing a different example of how the image signal components of an image signal can be extracted in the embodiment of the first method for determining the shape and location of an irradiation field in accordance with the present invention.

Hereinafter, by the term "directions of signal extraction" is meant the directions of the lines along which positions on the stimulable phosphor sheet lie, the image signal components representing the image information at said positions undergoing the signal extraction starting with the image signal component representing the image information at the position at one end of the line. The directions D1, D2, D3, . . . , Dn of the signal extraction need not necessarily be selected at equal angle intervals around the point in the region inside of the radiation image. For example, as shown in FIG. 8, a plurality of points which lie at equal distance intervals along edge portions of the stimulable phosphor sheet 103 may be selected, and directions D1, D2, D3, . . . , Dn radiating from a point P in the region inside of the irradiation field 103A towards the plurality of said points may be selected as the directions of signal extraction.

Figure 9:
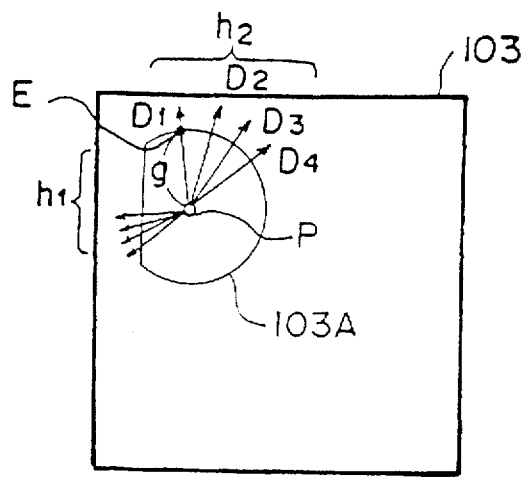
FIG. 9 is an explanatory view showing a different example of how the image signal components of an image signal can be extracted in the embodiment of the first method for determining the shape and location of an irradiation field in accordance with the present invention.

Furthermore, as shown in FIG. 9, the directions D of the signal extraction may have larger intervals between them in a region where the distance g between a point P inside of the irradiation field 103A and a prospective contour point E does not change very much, i.e. in the region corresponding to a region h1. In a region where the distance g changes markedly, i.e. in the region corresponding to a range h2, the directions D of the signal extraction may have smaller intervals between them.

In general, the preliminary readout described above is carried out for picture elements which are larger than those of the final readout. Differentiation processing for detecting the prospective contour point may be carried out on image signal components obtained by such a comparatively rough read-out operation. Alternatively, the image signal components may be interpolated to obtain image signal components representing picture elements of a finer resolution, and differentiation processing may be carried out for this larger number of image signal components. As another alternative, differentiation processing may be conducted for image signal components obtained by averaging the values of the image signal components detected at a plurality of picture elements.

When the irradiation field on the stimulable phosphor sheet 103 is not limited and no radiation blocking material is used during the operation for recording the radiation image, the detected irradiation field represents the overall region of the stimulable phosphor sheet 103. Therefore, the setting values (a), (b), and (c) can still be adjusted to appropriate values. However, in order to prevent the irradiation field determining circuit 220 from carrying out unnecessary processing in this case, a switch for turning the operation of the irradiation field determining circuit 220 on and off should preferably be provided, and the control circuit 314 should preferably be constituted so as to pass all the preliminary read-out image signal Sp therethrough when the irradiation field determining circuit 220 is off. With this configuration, in cases where it is known in advance that the image readout is carried out from a stimulable phosphor sheet 103 on which a radiation image has been stored without limiting the irradiation field, all of the preliminary read-out image signal Sp can be quickly subjected to a histogram analysis.

The region over which the image readout is carried out in the final read-out section 40 may be controlled in accordance with the information representing the detected irradiation field. In such cases, the final readout is carried out only over the irradiation field on the stimulable phosphor sheet 103, and therefore the read-out processing speed can be kept high.

In the radiation image recording and reproducing system shown in FIG. 1, the preliminary read-out section and the final read-out section are disposed independently. However, as disclosed in, for example, U.S. Pat. No. 4,527,060, a single read-out system may be used for the preliminary read-out and the final read-out. In this case, after the preliminary readout is finished, the stimulable phosphor sheet is returned to the read-out system by a sheet conveyance means and then the final readout is carried out. During the preliminary readout, the stimulation energy of the stimulating rays is adjusted by a stimulating ray energy adjusting means to be lower than the stimulation energy of the stimulating rays used in the final readout. The first method for determining the shape and location of an irradiation field in accordance with the present invention is also applicable to such cases.

Also, instead of determining the shape and location of an irradiation field based on the preliminary read-out image signal, the shape and location of the irradiation field may be determined with the first method of the present invention by utilizing the final read-out image signal or an image signal, which is obtained by directly carrying out an image read-out process corresponding to a final read-out process without first conducting the preliminary readout. In this case, information on the determined irradiation field can be utilized for, for example, adjusting the image processing condition setting value (c).

In the aforesaid embodiment of the first method for determining the shape and location of an irradiation field in accordance with the present invention, the image signal detected from the stimulable phosphor sheet is used. The first method for determining the shape and location of an irradiation field in accordance with the present invention is also applicable when a radiation image is read out from one of other recording media, such as X-ray film, on which an X-ray image has been recorded.

An embodiment of the second method for determining the shape and location of an irradiation field in accordance with the present invention will be described hereinbelow. In this embodiment, the shape and location of an irradiation field are determined in a radiation image recording and reproducing system having the same structure as that shown in FIG. 1.

Figure 10:
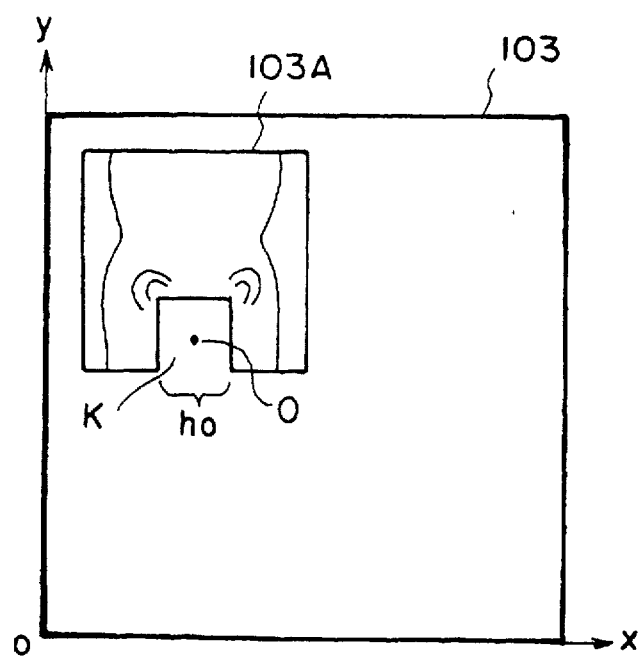
FIG. 10 is an explanatory view showing an example of a radiation image stored on a stimulable phosphor sheet in an embodiment of the second method for determining the shape and location of an irradiation field in accordance with the present invention.

In the radiation image recording and reproducing system shown in FIG. 1, as illustrated in FIG. 2, when the radiation image of the object 101 is recorded, the irradiation field is often limited on the stimulable phosphor sheet 103, and part of the object 101 is often covered with the radiation blocking plate. In FIG. 2, reference character J represents the image part corresponding to the radiation blocking plate. Also, as illustrated in FIG. 10, it often occurs that the irradiation field stop having a concave shape is used. In FIG. 10, reference character K represents the part, which corresponds to the concave part of the irradiation field stop and which is located outside of the irradiation field. The image part J corresponding to the radiation blocking plate and the part K outside of the irradiation field have image densities markedly lower than the density of the object image part related to a diagnosis.

How the control circuit 314 accurately adjusts the read-out gain setting value (a), the scale factor setting value (b), and the image processing condition setting value (c) when the radiation image includes the image part J corresponding to the radiation blocking plate or the part K outside of the irradiation field will be described hereinbelow with reference to FIG. 11.

Figure 11:
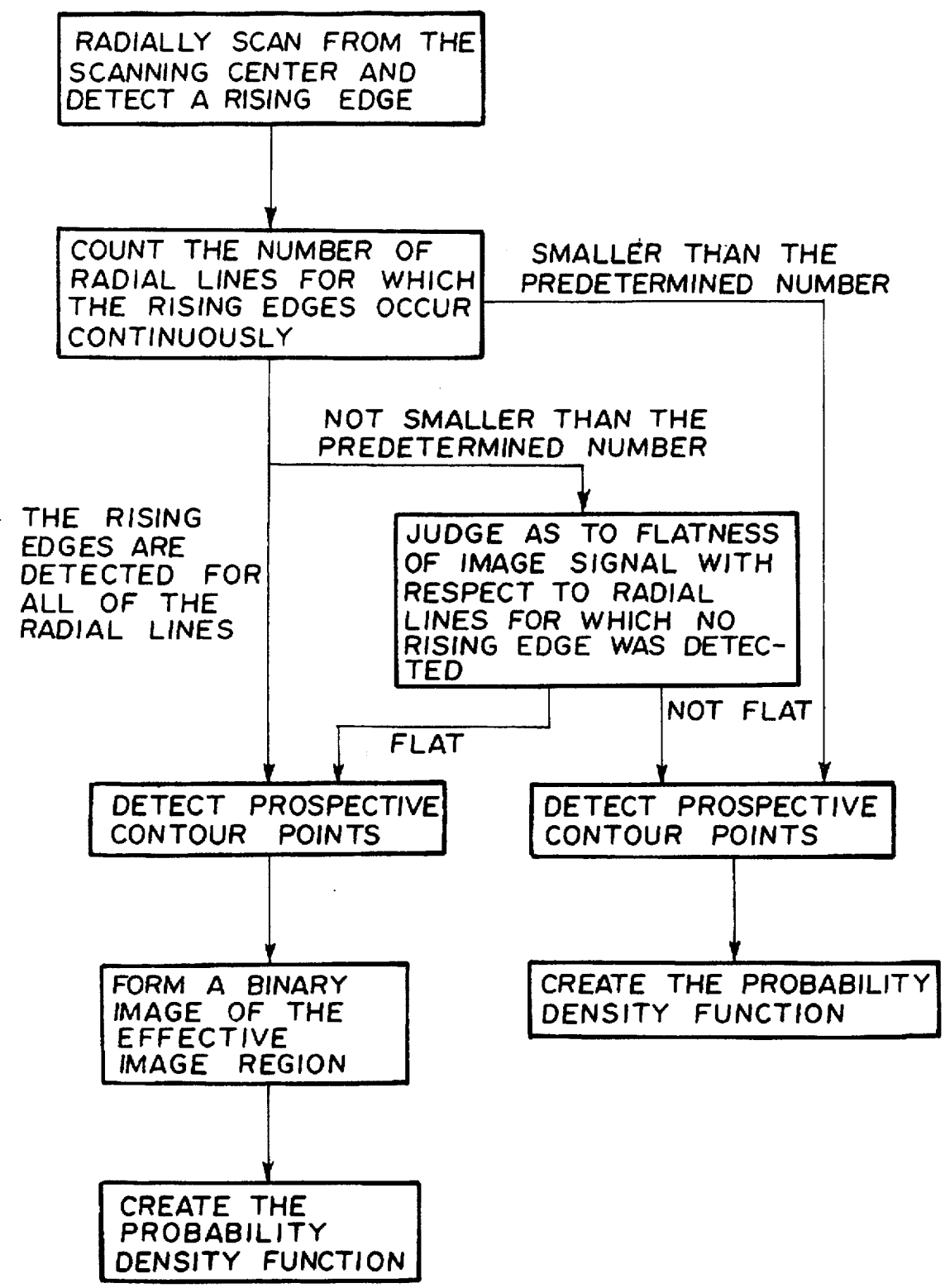
FIG. 11 is a block diagram showing part of the radiation image recording and reproducing system of FIG. 1 wherein the embodiment of the second method for determining the shape and location of an irradiation field in accordance with the present invention is employed.

As shown in FIG. 11, in the irradiation field determining circuit 220, signal scanning is carried out on the image signal components of the preliminary read-out image signal Sp starting with the component corresponding to a scanning center and continuing with components corresponding to positions on the stimulable phosphor sheet 103 located along each of lines in radial directions. In this manner, a rising edge in the preliminary read-out image signal Sp is detected. Thereafter, the number of the lines in the radial directions, for which the rising edges in the preliminary read-out image signal Sp occur continuously, is counted. In cases where the rising edges in the preliminary read-out image signal Sp occur with respect to all of the lines in the radial directions, the contour of the irradiation field is detected, and it is determined that the region extending between each rising edge and the contour of the irradiation field is an effective image region. The effective image region is then converted into a binary image, and the probability density function is created from the binary image. The read-out gain setting value (a), the scale factor setting value (b), and the image processing condition setting value (c) are adjusted in the control circuit 314 in accordance with the results of an analysis of the probability density function.

In cases where the rising edges in the preliminary read-out image signal Sp occur continuously with respect to at least a predetermined number of the lines in the radial directions, judgments are made as to the flatness of the image signal components corresponding to positions on the stimulable phosphor sheet 103 located along each of the lines in the radial directions, for which no rising edge in the preliminary read-out image signal Sp was found, i.e., as to whether the values of these image signal components are or are not uniform. When it has been judged that the image signal components corresponding to positions on the stimulable phosphor sheet 103 located along each of the lines in the radial directions, for which no rising edge was found, are flat, an effective image region is detected and the corresponding probability density function is created in the same manner as that when the rising edges in the preliminary read-out image signal Sp were detected for all of the lines in the radial directions. Specifically, with respect to the lines in the radial directions, for which the rising edges in the preliminary read-out image signal Sp were detected, the contour of the irradiation field is detected, and it is determined that the region extending between each rising edge and the contour of the irradiation field is an effective image region. The effective image region is then converted into a binary image, and the probability density function is created from the binary image.

If the number of the lines in the radial directions, for which the rising edges in the preliminary read-out image signal Sp occur continuously, is smaller than the predetermined number, or if it has been judged that the image signal components corresponding to positions on the stimulable phosphor sheet 103 located along each of the lines in the radial directions, for which no rising edge in the preliminary read-out image signal Sp was found, are flat, prospective contour points are detected, and the probability density function is created from the image signal components corresponding to the region surrounded by the prospective contour points.

The processes described above will hereinbelow be described in detail.

First, how the signal extraction is carried out on the image signal representing a radiation image, which has been recorded with part of the object being covered with a radiation blocking plate as shown in FIG. 2, will be described hereinbelow. The irradiation field determining circuit 220 extracts the image signal components of the digital preliminary read-out image signal Sp, which correspond to positions on the stimulable phosphor sheet 103 located along a line in the direction D1 shown in FIG. 5. Also, the irradiation field determining circuit 220 extracts the image signal components corresponding to positions on the stimulable phosphor sheet 103 located along each of lines in the directions D2, D3, . . . , Dn. The plurality of the lines along the directions D2, D2, D3, . . . , Dn radiate from the point O, which is located in the region inside of the radiation image on the stimulable phosphor sheet 103, towards the edges of the stimulable phosphor sheet 103. In this embodiment, lines along the radial directions D1, D2, D3, . . . , Dn radiate at equal angle intervals. The point O is located in the region inside of the image part J corresponding to the radiation blocking plate. Also, if the size of the stimulable phosphor sheet 103 is 256 mm ×192 mm, approximately 120 directions are selected as the radial directions D1, D2, D3, . . . , Dn.

Figure 12:
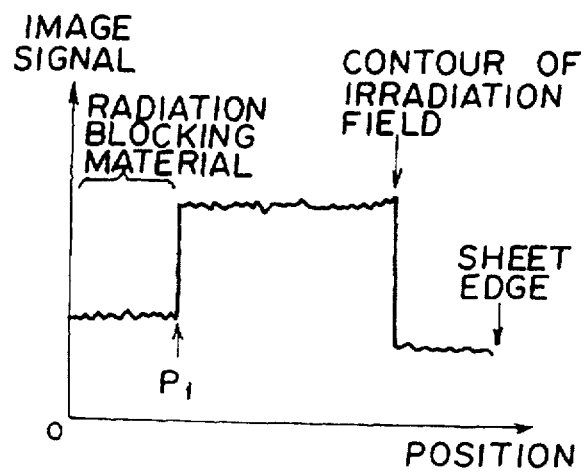
FIG. 12 is a graph showing an example of the distribution of image signal components of an image signal in the embodiment of the second method for determining the shape and location of an irradiation field in accordance with the present invention.

The levels of the image signal components of the preliminary read-out image signal Sp for the region inside of an irradiation field 103A are distinctly higher than those for the region outside of the irradiation field 103A. Also, the levels of the image signal components of the preliminary read-out image signal Sp for the region inside of the image part corresponding to the radiation blocking material are distinctly lower than those for the region outside of the image part corresponding to the radiation blocking material. Therefore, the values of the image signal components of the preliminary read-out image signal Sp corresponding to positions on the stimulable phosphor sheet 103 located along, for example, the life in the radial direction D1 shown in FIG. 5 are distributed as shown in FIG. 12.

Figure 13:
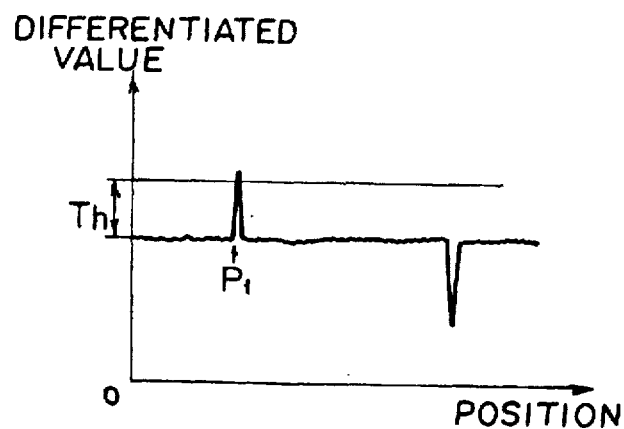
FIG. 13 is a graph showing an example of the distribution of the values of the differences between neighboring image signal components in the embodiment of the second method for determining the shape and location of an irradiation field in accordance with the present invention.

Thereafter, differentiation processing is carried out on the image signal components of the preliminary read-out image signal Sp, which correspond to positions on the stimulable phosphor sheet 103 located along each of lines in the plurality of the radial directions, which lines radiate from the point O located in the region inside of the radiation image towards the edges of the stimulable phosphor sheet 103. From the differentiation processing, the differentiated values representing the values of differences between neighboring image signal components are obtained. Thereafter, a judgment is made as to whether a point P1 shown in FIG. 13, at which the differentiated value increases beyond a predetermined threshold value Th, occurs or does not occur while the differentiation processing is proceeding from the image signal component corresponding to the point O located in the radiation image towards the image signal component corresponding to the edge of the stimulable phosphor sheet 103. In cases where it has been judged that such a point P1 occurs for all of the lines in the radial directions, a prospective contour point, which is considered as being present on the contour of the irradiation field 103A on the stimulable phosphor sheet 103, is then detected from the aforesaid differentiated values. Specifically, as shown in FIG. 13, the absolute values of the differentiated values obtained from the image signal components, which are distributed as shown in FIG. 12, change markedly at the contour of the irradiation field and at the edge of the image part J corresponding to the radiation blocking plate. Therefore, for example, of the points at which the absolute values of the differentiated values exceed a predetermined threshold value, a point which is farthest from the point O located in the region inside of the radiation image is detected as a prospective contour point.

After the prospective contour point is detected in the manner described above, it is determined that the region extending from the point P1 to the prospective contour point is the effective image region.

Thereafter, a binary image is formed by allocating a value of "1" to the image signal components corresponding to the effective image region and the vicinity of the effective image region and allocating a value of "0" to the image signal components corresponding to the other region. The probability density function is then created in accordance with the binary image. The probability density function thus created is the one only for the region obtained by removing the region inside of the image part corresponding to the radiation blocking material from the region on the stimulable phosphor sheet 103 which was actually exposed to the radiation. The control circuit 314 carries out an analysis of the probability density function which has thus been created. Therefore, the aforesaid sitting values (a), (b), and (c) are made suitable for the actual image information stored on the stimulable phosphor sheet 103.

How signal extraction is carried out on the preliminary read-out image signal Sp detected from the radiation image, which has been recorded by using the concave irradiation field stop, will be described hereinbelow.

Figure 14:
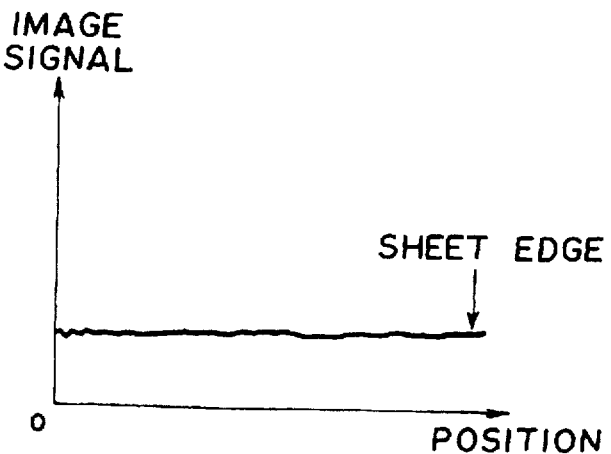
FIG. 14 is a graph showing a different example of the distribution of image signal components of an image signal in the embodiment of the second method for determining the shape and location of an irradiation field in accordance with the present invention.

As illustrated in FIG. 10, the point O with which the signal extraction is started is located in the part K outside of the concave irradiation field on the stimulable phosphor sheet 103. In such cases, as in the case of the radiation image shown in FIG. 2, the levels of the image signal components of the preliminary read-out image signal Sp extracted along a line in the direction radiating from the point O towards the irradiation field 103A are distributed as shown in FIG. 12. However, as illustrated in FIG. 14, the levels of the image signal components of the preliminary read-out image signal Sp extracted along a line in the direction radiating from the point O towards a region ho shown in FIG. 10 are distinctly lower than the levels of the image signal components corresponding to the region inside of the irradiation field 103A and show little change (i.e., are flat).

Therefore, in the irradiation field determining circuit 220, the prospective contour points in the region other than the region ho shown in FIG. 10 are detected. Also, the points P1, at which the differentiated values resulting from the carrying out of the differentiation processing on the extracted image signal components increase beyond the predetermined threshold value Th, are detected. The points P1 are detected for the lines in all of the radial directions other than those radiating towards the region ho. As illustrated in FIG. 14, the image signal components corresponding to positions on the stimulable phosphor sheet 103 located along lines in the directions radiating towards the region ho, for which lines the point P1 is not detected, are flat. Therefore, for each of the lines in the radial directions for which the points P1 were detected, it is determined that the region extending between the point P1 and the corresponding prospective contour point is the effective image region. Thereafter, the binary image is formed in the manner described above, and the probability density function is created. The probability density function is analyzed in the control circuit 314.

In the aforesaid embodiment of the second method for determining the shape and location of an irradiation field in accordance with the present invention, the extraction of the image signal components along each of the lines in the radial directions is started on the image signal component corresponding to the point, which is located in the region inside of the image part corresponding to the radiation blocking plate or in the region outside of the irradiation field. In cases where the signal extraction is started on the image signal component representing the image information stored at a point located in the region inside of the radiation image, the processes described above need not be carried out. In such cases, the prospective contour points may first be detected, and then the shape and location of the irradiation field may be determined. For the purposes of keeping the accuracy, with which the shape and location of the irradiation field are determined, high, a judgment may be made as to the characteristics of the detected prospective contour point, and the region other than the region, which corresponds to the radiation blocking material or the part outside of the concave irradiation field, may thereby be detected as the irradiation field.

As described above with reference to FIGS. 8 and 9, in the second method for determining the shape and location of an irradiation field in accordance with the present invention, the directions D1, D2, D3, ..., Dn of the signal extraction need not necessarily be selected at equal angle intervals around the point in the region inside of the radiation image.

Also, as in the first method for determining the shape and location of an irradiation field in accordance with the present invention, differentiation processing for detecting the prospective contour point may be carried out on image signal components obtained by a comparatively rough read-out operation. Alternatively, the image signal components may be interpolated to obtain image signal components representing picture elements of a finer resolution, and differentiation processing may be carried out for this larger number of image signal components. As another alternative, differentiation processing may be conducted for image signal components obtained by averaging the values of the image signal components detected at a plurality of picture elements.

When the irradiation field on the stimulable phosphor sheet 103 is not limited and no radiation blocking material is used during the operation for recording the radiation image, the probability density function is created from the image signal representing the overall region of the stimulable phosphor sheet 103. Therefore, the setting values (a), (b) and (c) can still be adjusted to appropriate values. However, as in the first method for determining the shape and location of an irradiation field in accordance with the present invention, in order to prevent the irradiation field determining circuit 220 from carrying out unnecessary processing in this case, a switch for turning the operation of the irradiation field determining circuit 220 on and off should preferably be provided, and the control circuit 314 should preferably be constituted so as to pass all the preliminary read-out image signal Sp therethrough when the irradiation field determining circuit 220 is off.

Additionally, as described above, the region over which the image readout is carried out in the final read-out section 40 may be controlled in accordance with the information representing the irradiation field having been detected by the irradiation field determining circuit 220.

As in the first method for determining the shape and location of an irradiation field in accordance with the present invention, the second method for determining the shape and location of an irradiation field in accordance with the present invention is also applicable when the operation for reading out the radiation image is carried out with a radiation image recording and reproducing system wherein a single read-out system is used for the preliminary read-out and the final read-out.

Further, instead of determining the shape and location of an irradiation field based on the preliminary read-out image signal, the shape and location of the irradiation field may be determined with the second method of the present invention by utilizing the final read-out image signal or an image signal, which is obtained by directly carrying out an image read-out process corresponding to a final read-out process without first conducting the preliminary readout. In this case, information on the determined irradiation field can be utilized for, for example, adjusting the image processing condition setting value (c).

The second method for determining the shape and location of an irradiation field in accordance with the present invention is also applicable when a radiation image is read out from a recording medium other than the stimulable phosphor sheet, for example, from X-ray film on which an X-ray image has been recorded.

What is claimed is:

1. A method for determining the shape and location of an irradiation field, wherein an image signal, which is made up of a series of image signal components representing a radiation image of an object, is obtained from a recording medium, on which the radiation image has been recorded, contour points, which are considered as being present on a contour of the irradiation field on the recording medium, are detected from image signal components corresponding to positions on the recording medium located along each of a plurality of lines in a respective plurality of radial directions, which lines radiate from a predetermined point located inside of the irradiation field on the recording medium towards edges of the recording medium, and a resulting region surrounded by line segments connecting the thus detected contour points is detected as the irradiation field, the method for determining the shape and location of an irradiation field comprising the steps of:

i) carrying out differentiation processing on the image signal components corresponding to positions on the recording medium located along each of the plurality of lines in the plurality of radial directions, differentiated values being thereby obtained from the differentiation processing, ii) with respect to each of said plurality of lines in the plurality of radial directions, making judgements as to whether or not a differentiated value increases beyond a predetermined value while the differentiation processing is proceeding from an image signal component corresponding to said predetermined point, towards an image signal component corresponding to an edge of the recording medium, iii) in cases where it has been judged at step ii) that differentiated values increasing beyond said predetermined value occur with respect to each of said plurality of lines in the plurality of radial directions, with respect to each of the plurality of lines in the plurality of radial directions, determining that the region, which extends from a point on the recording medium associated with each of the differentiated values judged to be increasing beyond said predetermined value to the corresponding contour point, is an effective image region, iv) in cases where it has been judged at step ii that differentiated values increasing beyond said predetermined value occur with respect to at least a predetermined number of lines among the plurality of lines in the plurality of radial directions, a) making judgments as to whether or not the image signal components corresponding to positions on the recording medium located along each of the plurality of lines in radial directions, for which the differentiated values increasing beyond said predetermined value do not occur, are uniform b) when it has been judged at step iv) a) that the image signal components are uniform, with respect to each of the plurality of lines in radial directions, for which the differentiated values increasing beyond said predetermined value occur, determining that the region, which extends from a point on the recording medium associated with each of the differentiated values judged to be increasing beyond said predetermined value to the corresponding contour point, is an effective image region, and v) determining that said effective image region is the irradiation field.

2. A method as defined in claim 1 wherein processing for calculating the differences between neighboring image signal components is carried out as said differentiation processing.

3. A method as defined in claim 1 wherein said recording medium is a stimulable phosphor sheet.

4. A method as defined in claim 3 wherein said image signal is obtained by (a) exposing said stimulable phosphor sheet to stimulating rays, which causes said sheet to emit light in proportion to the amount of energy stored thereon during its exposure to radiation, and (b) photoelectrically detecting the emitted light.

5. A method as defined in claim 4 wherein said stimulating rays make up a laser beam.

6. A method as defined in claim 1 wherein said recording medium is photographic film.

* * * * *